US008279573B2

(12) United States Patent
Wu et al.

(10) Patent No.: US 8,279,573 B2
(45) Date of Patent: Oct. 2, 2012

(54) CIRCUIT PROTECTION DEVICE AND SYSTEM

(75) Inventors: Juntao Wu, Niskayuna, NY (US); John Thomas Garrity, Niskayuna, NY (US); Chun Cheryl Zhan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 539 days.

(21) Appl. No.: 12/512,266

(22) Filed: Jul. 30, 2009

(65) Prior Publication Data

US 2011/0026183 A1 Feb. 3, 2011

(51) Int. Cl.
*H02H 9/06* (2006.01)

(52) U.S. Cl. ........................................ 361/115; 361/120

(58) Field of Classification Search .................. 361/115, 361/120

See application file for complete search history.

(56) References Cited

U.S. PATENT DOCUMENTS

| | | | | |
|---|---|---|---|---|
| 4,150,266 | A * | 4/1979 | Patrichi | 200/61.08 |
| 4,935,666 | A * | 6/1990 | McCann | 313/595 |
| 5,043,636 | A | 8/1991 | Klopotek et al. | |
| 5,261,315 | A | 11/1993 | Marinos | |
| 5,569,894 | A | 10/1996 | Uchida et al. | |
| 5,694,284 | A * | 12/1997 | Oda et al. | 361/119 |
| 5,854,732 | A * | 12/1998 | Murray | 361/120 |
| 5,901,025 | A | 5/1999 | Takahashi et al. | |
| 5,982,593 | A | 11/1999 | Kimblin et al. | |
| 6,707,651 | B2 | 3/2004 | Elms et al. | |
| 7,075,767 | B2 | 7/2006 | Gemme et al. | |
| 7,535,234 | B2 | 5/2009 | Mernyk et al. | |
| 7,643,265 | B2 * | 1/2010 | Loader et al. | 361/120 |
| 7,714,240 | B1 * | 5/2010 | Roesler et al. | 200/181 |
| 2003/0112573 | A1 | 6/2003 | Perez | |
| 2005/0063118 | A1 | 3/2005 | Durth et al. | |
| 2008/0151444 | A1 | 6/2008 | Upton | |
| 2009/0161272 | A1 | 6/2009 | Asokan et al. | |
| 2010/0141166 | A1 | 6/2010 | Kim | |

FOREIGN PATENT DOCUMENTS

| | | |
|---|---|---|
| WO | 2009028881 A2 | 3/2009 |

OTHER PUBLICATIONS

R. Radhakrishnan et al., "Design, Development and Application of Smart Fuses-Part 1," IEEE Transactions on Industry Applications, vol. 30, No. 1, Jan./Feb. 1994, pp. 164-169.

J. Wu et al., "Arc Flash Detection System," U.S. Appl. No. 12/486,775, filed Jun. 18, 2009.

Search Report and Written Opinion issued in connection with corresponding PCT Application No. PCT/US2010/040128 on Sep. 10, 2010.

* cited by examiner

*Primary Examiner* — Rexford Barnie
*Assistant Examiner* — Tien Mai
(74) *Attorney, Agent, or Firm* — Penny A. Clarke

(57) ABSTRACT

A circuit protection device for protection of circuitry is provided. The circuit protection device comprises a housing defining a chamber and a plurality of conductors. The conductors are configured to connect to the circuitry and extending into the chamber, and comprise at least a first conductor and a second conductor spatially separated from the first conductor. The circuit protection device further comprises an ignition component disposed in the chamber and configured to electrically connect the first and second conductors. A circuit protection system is also presented.

21 Claims, 3 Drawing Sheets

CIRCUIT PROTECTION DEVICE AND SYSTEM

BACKGROUND

This invention relates generally to circuit protection devices and systems. More particularly, this invention relates to circuit protection devices and systems for mitigation of overcurrent, arc flash and/or short circuit faults.

Electric power circuits and switchgears have conductors separated by insulation. A broken conductor or a poor electrical connection between a conductor and another electrical element may cause series arc faults. Conductors with different potentials may cause parallel arc faults. Due to such series or parallel arc faults, a rapid energy release may occur resulting in an arc flash.

An arc flash generally produces high heat, intense light, and huge sound/shock waves similar to that of an explosion. For example, an arc flash induces temperatures as high as 20,000° C. so as to vaporize conductors and adjacent elements, and to release explosive energies to destroy surrounding circuits and cause damage.

Presently, circuit breakers are often used to protect electrical circuitry from damage due to overcurrent conditions. During an arc event, relay devices detect abnormal current signatures and trigger the circuit breakers to cut off power lines to protect electrical circuits.

However, such circuit breakers are generally controlled by electromechanical (EM) mechanisms to shift between open and closed states, and such EM mechanisms have relatively long response times. Further, although such circuit breakers cut off the power lines, residual energy generated during the arc event still needs to be released. As a result, the circuit breakers are generally destroyed due to the release of the residual energy.

Therefore, there is a need for a new and improved circuit protection device and system for mitigation of arc flash and overcurrent.

BRIEF DESCRIPTION

A circuit protection device for protection of a circuitry is provided in accordance with one embodiment of the invention. The circuit protection device comprises a housing defining a chamber and a plurality of conductors. The conductors are configured to connect to the circuitry and extending into the chamber, and comprise at least a first conductor and a second conductor spatially separated from the first conductor. The circuit protection device further comprises an ignition component disposed in the chamber and configured to electrically connect the first and second conductors.

A circuit protection system for protection of a circuitry is provided in accordance with another embodiment of the invention. The circuit protection system comprises a circuit protection device and a detection unit. The circuit protection device comprises a housing defining a chamber, a plurality of conductors, and an ignition component. The conductors are configured to connect to the circuitry and extending into the chamber, and comprise at least a first conductor and a second conductor spatially separated from the first conductor. The ignition component is disposed in the chamber and configured to electrically connect the first and second conductors. The detection unit is configured to detect one or more faults in the circuitry so as to send one or more trip signals to the ignition component to electrically connect the first and second conductors.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION OF THE INVENTION

Embodiments of the present disclosure are described herein with reference to the accompanying drawings. In the subsequent description, well-known functions or constructions are not described in detail to avoid obscuring the disclosure in unnecessary detail.

Figure 1:
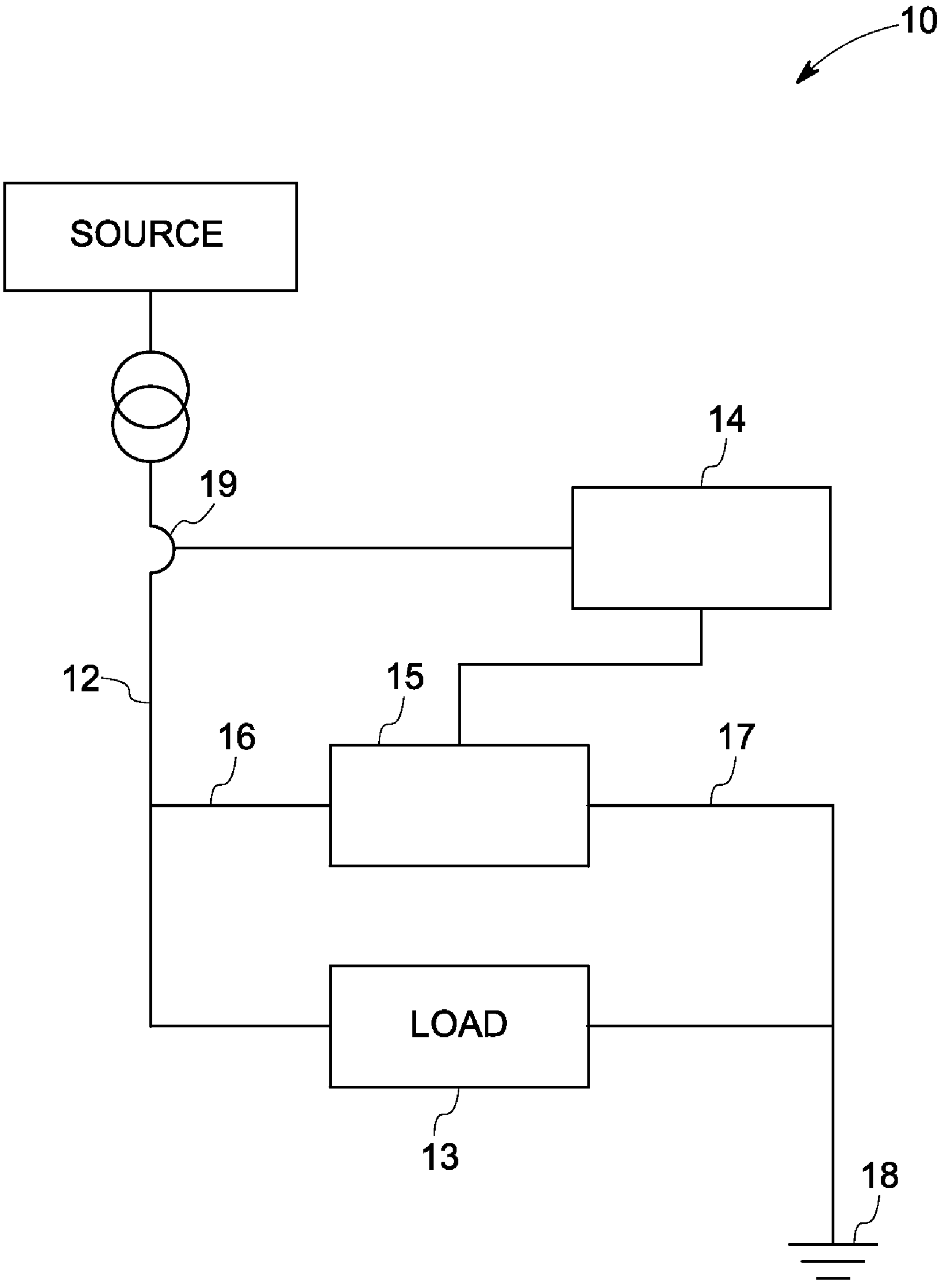
FIG. 1 is a schematic diagram of an arrangement of a circuit protection system and circuitry in accordance with one embodiment of the invention.

FIG. 1 is a schematic diagram of an arrangement of a circuit protection device 10 and circuitry (not labeled) in accordance with one embodiment of the invention. For the arrangement illustrated in FIG. 1, the circuitry comprises an electrical power source 11 configured to generate and output electrical power, and a power line 12 configured to deliver the electrical power from the electrical power source 11. A load 13 receives the electrical power from the power source 11 via the power line 12.

For the illustrated arrangement, the circuit protection system 10 comprises a detection unit 14 and a circuit protection device or smart fuse 15 electrically connected to the detection unit 14. In embodiments of the invention, the detection unit 14 is configured to detect one or more faults, such as arc flash, overcurrent, and/or short circuit faults in the circuitry, so as to generate and output one or more trip signals to the circuit protection device 15 for protection of the circuitry.

In certain embodiments, the detection unit 14 may detect the arc flash fault(s) via arc-induced light, arc-induced sound, and/or arc-induced temperature change in the circuitry. In some non-limiting examples, the faults, such as arc flash may occur between a power line and ground or a neutral conductor (not shown). Locations of the fault occurrence may generally be categorized as closed locations and open locations. Closed locations may indicate panel boards or enclosed switchgear panels. Open locations may comprise regions that are exposed to the environment outside the enclosure, such as bus bars or electrical leads that connect switchgears or panels from an electrical source to loads.

In embodiments of the invention, the detection unit 14 is not limited to any particular arc flash detection system or any particular overcurrent or short circuit detection system. In non-limiting examples, the detection unit 14 may comprise current detection systems for detection of an arc flash, an overcurrent, and/or a short circuit. In one non-limiting example, the detection unit 14 may comprise an arc flash detection system described in U.S. patent application Ser. No. 12/486,775, entitled "Arc flash detection system," which is hereby incorporated by reference in its entirety.

In the illustrated example, the circuit protection device 15 is electrically connected to the detection unit 14 for receiving the trip signals from the detection unit 14, and comprises a first conductor 16 and a second conductor 17 to electrically connect to the power line 12. For the illustrated arrangement, the first conductor 16 and the second conductor 17 are electrically isolated from each other in a normal state. The load 13 is placed on the power line 12 and connected to ground 18. The first conductor 16 is connected to a first contact on the power line 12 in the circuitry. The second conductor 17 is connected to a second contact including, but not limited to the grounded 18 on the power line 12 in the circuitry. For example, the conductor 17 may be connected to a device, such as an energy absorption device (not shown) in the circuitry for absorption of the energy released from the circuitry.

In some examples, the circuit protection system 10 may further comprise a protective device 19 disposed between the power source 11 and the power line 12, so that the electrical power is delivered to the power line 12 from the power source 11 through the protective device 19 when the protective device 19 is in a working state. Non-limiting examples of the protective device 19 may comprise a circuit breaker that may be operated through electrical command signals. Thus, in certain applications, the detection unit 14 may send the trip signal(s) to the protective device 19 to shut off the connection between the power line 12 and the power source 11.

Figure 2:
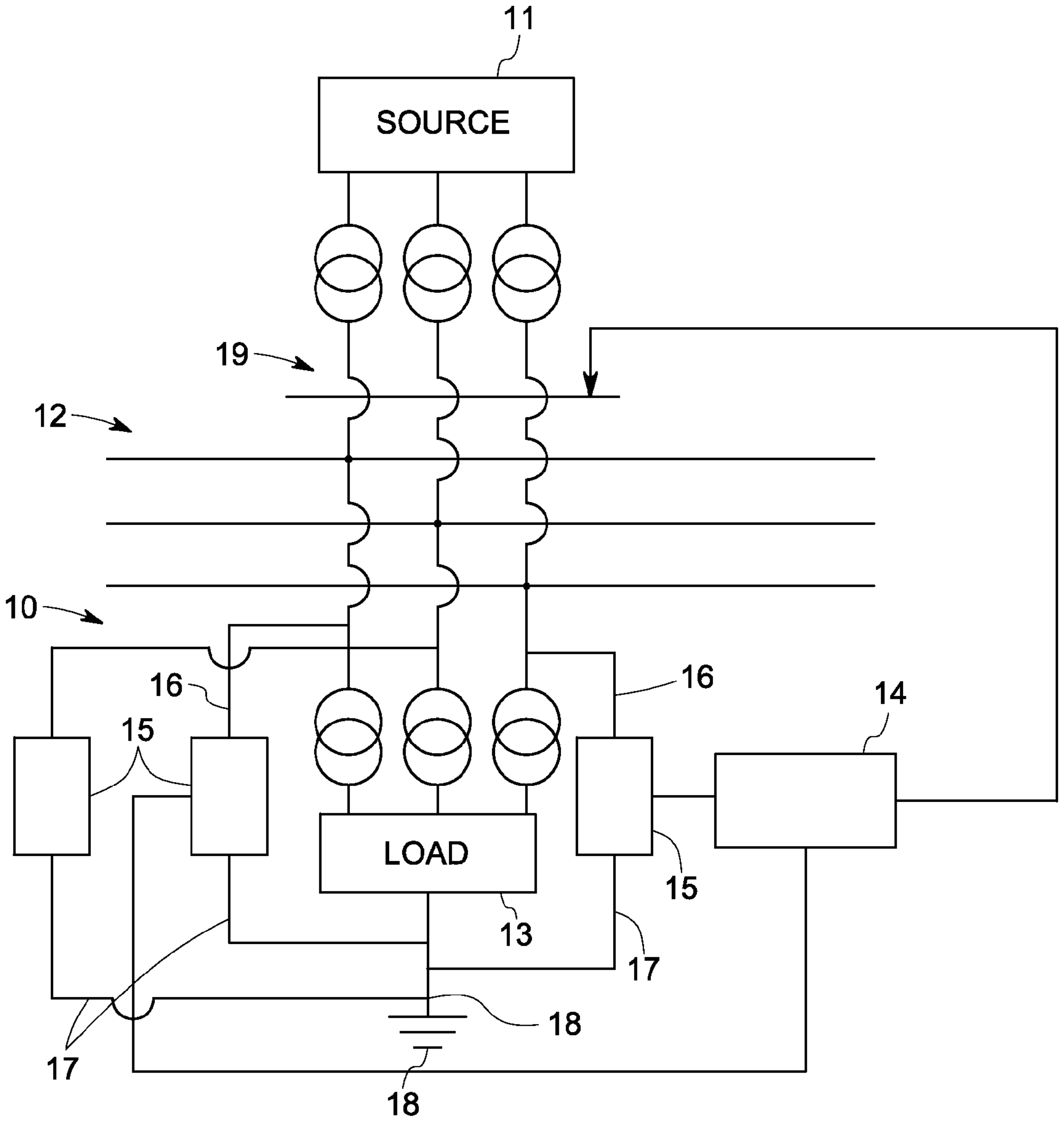
FIG. 2 is a schematic diagram of an arrangement of the circuit protection system and the circuitry in accordance with another embodiment of the invention.

In certain examples, the circuitry may comprise more than one power line for carrying one or more loads. FIG. 2 is a schematic diagram of an arrangement of the circuit protection system and the circuitry in accordance with another embodiment of the invention. It should be noted that the same numerals in FIGS. 1-4 may indicate similar elements.

As illustrated in FIG. 2, the circuitry comprises more than one, such as three power lines 12 configured to deliver the electrical power from the electrical power source 11. A load 13 receives the electrical power from the power source 11 via the power lines 12. More than one, such as three circuit protection devices 15 are provided to electrically connect the detection unit 14. Each first conductor 16 of the circuit protection devices 15 is connected to a first contact on the respective power line 12 in the circuitry. Each second conductor 17 is connected to a second contact on the respective power line 12 in the circuitry. The first and second contacts are different contacts.

For the illustrated arrangement, the detection unit 14 detects faults, such as arc faults, overcurrent faults, and/or short circuit faults between multiple power lines, and/or between a power line and ground or a neutral conductor (not shown) due to series and/or parallel arc faults, so as to generate and output one or more trip signals to the circuit protection devices 15 to mitigate the occurrence of faults. As depicted in FIG. 2, the conductors 17 are connected to ground 18. Similar to the arrangement in FIG. 1, in certain applications, the conductors 17 may be connected to a device in the circuitry, such as an energy absorption device (not shown) for absorption of the energy released from the circuitry.

It should be noted that the arrangements in FIGS. 1-2 is merely illustrative. In some applications, the one or more protective devices 19 may not be employed. More than one load 13 may be provided.

Figure 3:
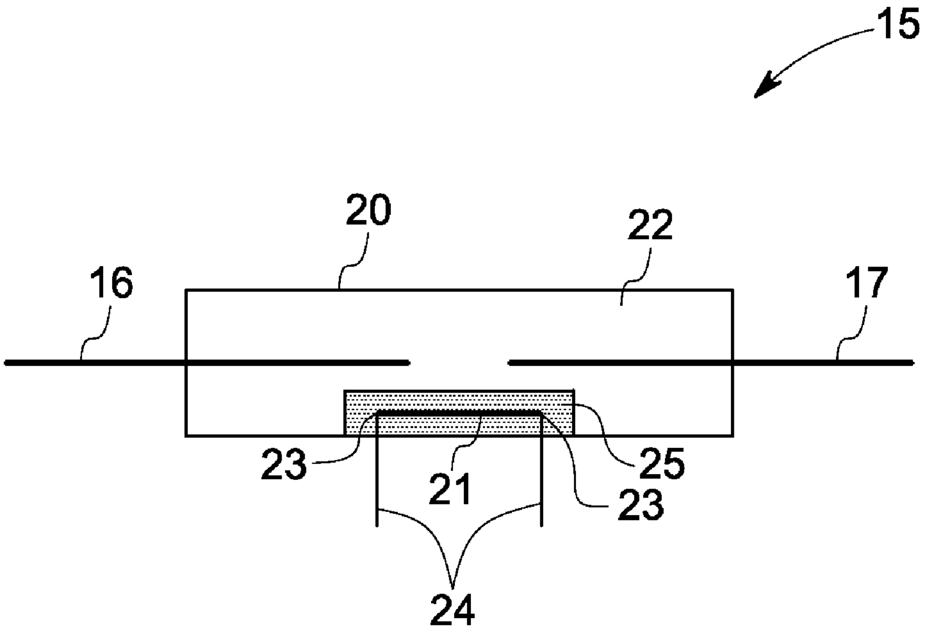
FIG. 3 is a schematic diagram of a circuit protection device in accordance with one embodiment of the invention.

FIG. 3 is a schematic diagram of the circuit protection device 15 in accordance with one embodiment of the invention. In some examples, the circuit protection device 15 may protect the circuitry from being damaged by diverting large amount of electric current from the circuitry in the event of current faults or arc flash faults.

As depicted in FIG. 3, the circuit protection device 15 comprises a housing 20, a pair of conductors 16 and 17, and an ignition component 21. In non-limiting examples, the ignition component 21 may comprise a fuse. In the illustrated example, two conductors 16 and 17 are provided. In other examples, the circuit device 15 may comprise more than two conductors.

For the illustrated arrangement, the housing 20 defines a chamber 22. In certain non-limiting examples, the housing 20 may comprise dielectric materials. Ends (not labeled) of the respective conductors 16 and 17 extend into the chamber 22 from opposite sidewalls (not labeled) of the housing 20, and the two ends thereof are spatially separated from each other for a certain distance in the chamber 22. Opposite ends (not labeled) of the respective ends of the conductors 16 and 17 extends beyond the housing 20 and are configured to alternatively connect to a first contact and a second contact in a circuitry. In some examples, the conductors 16 and 17 may comprise electrically conductive materials including, but not limited to metal, such as copper. Additionally, the conductors 16 and 17 may have cylindrical shapes or other shapes, such as rectangular shapes.

In some applications, the chamber 22 may be hermetic and under vacuum, so that the distance between the two ends of the conductors 16 and 17 in the chamber 22 may be smaller than would be the case for conductors exposed in atmosphere. In other applications, the chamber 22 may not be hermetic and/or not be under vacuum. In one non-limiting example, a gaseous dielectric medium, such as sulfur hexafluoride (SF6) may or may not be dispersed into the chamber 22 to insulate the two ends of the conductors 16 and 17.

As illustrated in FIG. 3, the fuse 21 is stationary within the chamber 22 and adjacent to a gap (not labeled) therebetween, and comprises a pair of opposite terminals 23. A pair of electrically conductive wires 24 may be provided to connect the respective terminals 23 and extend beyond the housing 20 for connection to the detection unit 14 (as shown in FIGS. 1-2). Thus, in certain applications, in addition to sending the trip signals to the fuse 21, the detection unit 14 may further pass a preset lower electric current through the fuse 21 in a normal state to monitor whether the fuse 21 is operable. In non-limiting examples, when the detection unit 14 detects a difference between a current in the circuitry and the preset value, a fault may be generated.

In some embodiments, the fuse 21 may comprise electrically conductive materials including, but not limited to metal, such as copper and tungsten. In non-limiting examples, the fuse 21 may have a cylindrical shape, and may have a diameter in a range from about 0.01 mm to about 10 mm. Alternatively, the fuse 21 may have other shapes, such as a rectangular shape.

Accordingly, in certain embodiments, after detecting the faults, such as arc faults and/or overcurrent faults in the circuitry, the detection unit 14 (shown in FIG. 1) may send one or more trip signals, such as a certain high current trip signal to the fuse 21 through the wires 24. Meanwhile, in certain examples, the detection unit 14 may send an alarm signal, which may include flashing LED, alarming sound, and/or electric signals.

Then, the fuse 21 may generate conducting mediums, such as vapor, particles, ions, or plasma via vaporization, heating, and/or explosion instantaneously, in one example, to build a discharging pathway between the conductors 16 and 17 so as to electrically connect the conductors 16 and 17. Thus, the energy released from the circuitry due to the faults is discharged from the circuitry through the connected conductors 16 and 17 instantaneously. As a result, the circuitry may be protected. Beneficially, because of the relatively simple configuration, the circuit protection device 15 may be replaced conveniently after discharge.

For the illustrated example, the circuit protection device 15 further comprises an enhancement element 25 disposed within the chamber 22, for example coated on an inner surface (not labeled) of the chamber or disposed on the fuse 21. Thus, in non-limiting examples, high temperatures and/or pressures produced during the vaporization and/or the ionization of the fuse 21 may cause the enhancement 25, for example, to be vaporized and/or ionized to enhance the electrical connection between the conductors 16 and 17.

For certain applications, the enhancement element 25 may comprise any material suitable for explosion (such as vaporization and/or ionization) under a certain temperature and pressure for building the electrical connection between the conductors 16 and 17. One non-limiting example of a suitable material for the enhancement element 25 comprises an electrical polymer. In other applications, the enhancement element 25 may not be provided.

Figure 4:
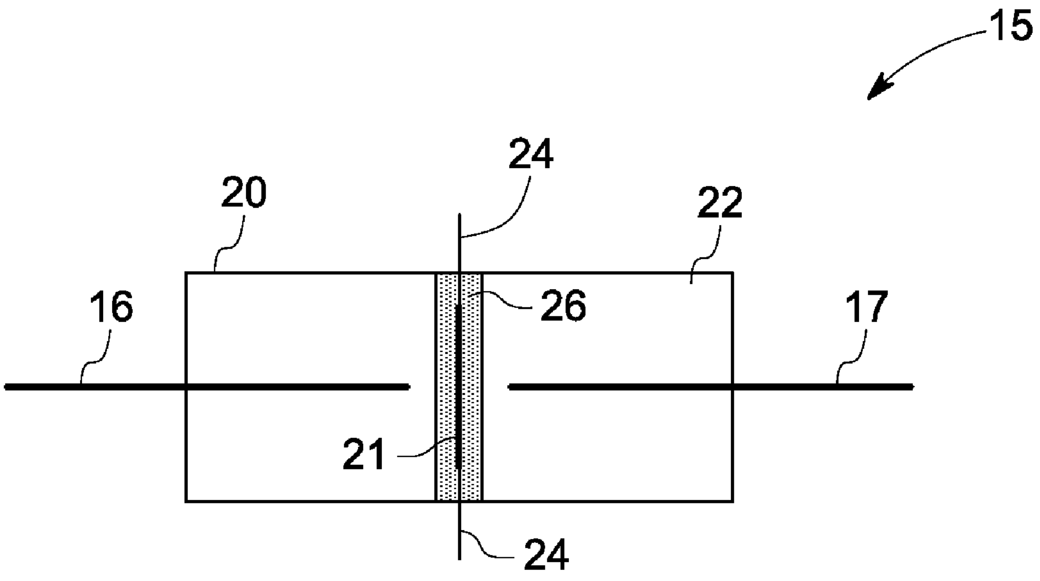
FIG. 4 is a schematic diagram of the circuit protection device in accordance with another embodiment of the invention.

FIG. 4 is a schematic diagram of the circuit protection device 15 in accordance with another embodiment of the invention. The illustrated arrangement is similar to the arrangement in FIG. 3, and the two arrangements differ in that the circuit protection device 15 in FIG. 4 comprises a dielectric element 26 disposed in the chamber 22 and located between two ends of the conductors 16 and 17. Thus, due to the isolation effect of the dielectric element 26, the distance between the conductors 16 and 17 may be small without causing discharging in a normal state.

In addition, for the illustrated arrangement, the wires 24 extend beyond the chamber from opposite sides of the circuit protection device 15. In certain examples, the wires 24 may extend beyond the circuit protection device 15 from the same side thereof.

In some embodiments, the dielectric element 26 may comprise any material having certain electric isolation capability for separation of the conductors 16 and 17. Non-limiting examples of suitable materials for the dielectric element 26 comprise polymers including, but not limited to polythene (PE), polypropylene (PP), poly(vinylidenechloride) (PVC), and combinations thereof.

For the illustrated example, the fuse 21 is disposed in the dielectric element 26. Thus, upon explosion, the fuse 21 breaks through the dielectric element 26 to create an electrical connection between the conductors 16 and 17. In certain applications, similar to the arrangement in FIG. 3, an enhancement element may also be employed, so that the enhancement element and the fuse may be disposed in the dielectric element 26. Alternatively, the enhancement element may not be employed.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

What is claimed is:

1. A circuit protection system for protection of a circuitry, the circuit protection system comprising:

a housing defining a chamber;

a plurality of conductors configured to connect to the circuitry and extending into the chamber, and comprising at least a first conductor and a second conductor spatially separated from the first conductor;

an ignition component disposed in the chamber and configured to electrically connect the first and second conductors; and a detection unit configured to detect one or more faults in the circuitry, so as to send one or more trip signals to the ignition component and to pass a current through the ignition component, to determine whether the ignition component is operable.

2. The circuit protection system of claim 1, wherein the ignition component is stationary within the chamber.

3. The circuit protection system of claim 1, wherein the ignition component comprises a fuse.

4. The circuit protection system of claim 1, wherein the ignition component is spatially separated from the first and second conductors.

5. The circuit protection system of claim 1, wherein the ignition component is configured to generate one or more of vapor, ions, plasma, and particles to electrically connect the first and second conductors.

6. The circuit protection system of claim 1, wherein the first and second conductors are electrically isolated from each other, and wherein the first and second conductors are further configured to discharge energy released from the circuitry after being electrically connected via the ignition component.

7. The circuit protection system of claim 1, wherein the chamber is hermetic and under vacuum.

8. The circuit protection system of claim 1, further comprising an enhancement element disposed in the chamber to enhance the electrical connection between the first and second conductors.

9. The circuit protection system of claim 1, further comprising a dielectric element configured to electrically isolate the first and second conductors, and wherein the ignition component is disposed in the dielectric element.

10. The circuit protection system of claim 9, wherein the dielectric element comprises one or more polymer materials.

11. The circuit protection system of claim 1, wherein the circuit protection device is configured to mitigate one or more faults generated in the circuitry, and wherein the one or more faults comprise one or more of an arc fault, an overcurrent fault, and a short circuit fault.

12. The circuit protection system of claim 1, further comprising sulfur hexafluoride dispersed in the chamber.

13. A circuit protection system for protection of a circuitry, the circuit protection system comprising:

a circuit protection device comprising:

a housing defining a chamber;

a plurality of conductors configured to connect to the circuitry and extending into the chamber, and comprising at least a first conductor and a second conductor spatially separated from the first conductor;

an ignition component comprising a fuse and disposed in the chamber and configured to electrically connect the first and second conductors; and a detection unit configured to detect one or more faults in the circuitry so as to send one or more trip signals to the ignition component to electrically connect the first and second conductors.

14. The circuit protection system of claim 13, wherein the one or more faults comprise one or more of an arc fault, an overcurrent fault, and a short circuit fault, and wherein the ignition component is spatially separated from the first and second conductors.

15. The circuit protection system of claim 13, wherein the detection unit is further configured to pass a current through the ignition component to determine whether the ignition component is operable.

16. The circuit protection system of claim 13, wherein the ignition component is stationary within the chamber.

17. The circuit protection system of claim 13, wherein the ignition component is configured to generate one or more of vapor, ions, plasma, and particles to electrically connect the first and second conductors.

18. The circuit protection system of claim 13, wherein the first conductor is electrically isolated from the second conductor, and wherein the first and second conductors are further configured to discharge energy released from the circuitry after being electrically connected via the ignition component.

19. The circuit protection system of claim 13, wherein the chamber is hermetic and under vacuum.

20. The circuit protection system of claim 13, wherein the circuit protection device further comprises an enhancement element disposed in the chamber to enhance the electrical connection between the first and second conductors.

21. The circuit protection system of claim 13, wherein the circuit protection device further comprises a dielectric element disposed between the first and second conductors, and wherein the ignition component is disposed in the dielectric element.

* * * * *